(12) United States Patent
Krauss et al.

(10) Patent No.: US 9,907,366 B2
(45) Date of Patent: Mar. 6, 2018

(54) BELT BUCKLE FOR A VEHICLE SAFETY BELT

(71) Applicant: Key Safety Systems, Inc., Sterling Heights, MI (US)

(72) Inventors: Walter Krauss, Berg (DE); Thomas Schrott, Feldafing (DE); Mark Seer, Weissenfeld (DE); Michael Bär, Munich (DE); Martin Specht, Feldafing (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 142 days.

(21) Appl. No.: 14/652,930

(22) PCT Filed: Dec. 4, 2013

(86) PCT No.: PCT/IB2013/002697
§ 371 (c)(1),
(2) Date: Jun. 17, 2015

(87) PCT Pub. No.: WO2014/096919
PCT Pub. Date: Jun. 26, 2014

(65) Prior Publication Data
US 2015/0296928 A1 Oct. 22, 2015

(30) Foreign Application Priority Data
Dec. 20, 2012 (DE) .................. 20 2012 012 254

(51) Int. Cl.
*A44B 11/25* (2006.01)
*A44B 11/00* (2006.01)
*B60R 22/12* (2006.01)
*F21V 23/04* (2006.01)
*F21V 33/00* (2006.01)
(Continued)

(52) U.S. Cl.
CPC ........ *A44B 11/2565* (2013.01); *A44B 11/003* (2013.01); *A44B 11/2515* (2013.01); *A44B 11/2523* (2013.01); *A44B 11/2546* (2013.01); *B60Q 3/233* (2017.02); *B60Q 3/242* (2017.02); *B60Q 3/64* (2017.02); *B60Q 3/80* (2017.02); *B60Q 3/82* (2017.02); *B60R 22/12* (2013.01);
(Continued)

(58) Field of Classification Search
CPC .............. A44B 11/2565; A44B 11/003; A44B 11/2523; A44B 11/2546; F21V 23/0442; F21V 33/0064; B60Q 3/0223; B60Q 3/0296; B60Q 3/0243; B60Q 3/0293; B60Q 3/004; B60R 22/12; F21W 2101/08
See application file for complete search history.

(56) References Cited

U.S. PATENT DOCUMENTS

| 7,360,794 B2 * | 4/2008 | Kohama | A44B 11/2523 280/801.1 |
| 2006/0097503 A1 * | 5/2006 | Kiyomizu | A44B 11/2561 280/801.1 |
| 2007/0039144 A1 * | 2/2007 | Ichida | A44B 11/2561 24/633 |

\* cited by examiner

*Primary Examiner* — Stephen F Husar
(74) *Attorney, Agent, or Firm* — Markell Seitzman (57) ABSTRACT

A belt buckle for a vehicle safety belt, comprising a housing (3) which is formed by at least two housing shells (1,2) joined together and in which a locking mechanism (4) is arranged, and a pushbutton (22), provided on said housing, for operating the locking mechanism (4), wherein at least two housing shells (1,2) are joined together at their shell rims and that elongated cover strips (8,9) made of solid material and covering the mutually abutting rims (17,18) of the housing shells (1,2) are fixed to the joined housing shells (1,2).

20 Claims, 5 Drawing Sheets

(51) Int. Cl.
 *B60Q 3/82* (2017.01)
 *B60Q 3/64* (2017.01)
 *B60Q 3/233* (2017.01)
 *B60Q 3/80* (2017.01)
 *B60Q 3/242* (2017.01)
 *F21W 101/08* (2006.01)

(52) U.S. Cl.
 CPC ...... *F21V 23/0442* (2013.01); *F21V 33/0064* (2013.01); *F21W 2101/08* (2013.01)

BELT BUCKLE FOR A VEHICLE SAFETY BELT

TECHNICAL FIELD

The invention relates to a belt buckle for a vehicle safety belt, comprising a housing in which a locking mechanism is arranged, and a pushbutton, provided on said housing, for operating the locking mechanism.

BACKGROUND AND SUMMARY OF THE INVENTION

Forming the belt buckle housing from two housing shells that are joined together by welding is known from the prior art. Providing opposite fixing projections on the housing shells for joining the shells together is also known (DE 43 10 9 28 C2). In the assembled state, the fixing projections have aligned openings into which a lock pin is inserted.

The object of the invention is to provide a belt buckle of the kind initially specified, in which the two housing shells can be joined securely together in a simple manner to form the housing.

This object is achieved according to the invention by claim 1. Advantageous developments of the invention are defined in the dependent claims.

In the invention, the at least two housing shells from which the housing is formed are joined at their shell rims. Elongated cover strips made of solid material and covering the mutually abutting rims of the housing shells are fixed to the joined housing shells. The cover strips may preferably be adapted to secure the housing shells to each other against a disconnecting movement.

The at least two housing shells may be joined to each other by welding them together at their rims. The resultant weld seams are covered by the cover strips. The at least two housing shells may preferably have engaging members at their shell rims, which by means of a particular movement can be brought into engagement with each other. By this means, the at least two housing shells are joined together.

It is also possible that the elongated cover strips are moulded integrally onto one of the two housing shells.

The engaging members are preferably embodied in such a way that they overlap in their engaged position, and that the housing shells are joined to each other by a movement substantially parallel to the rims of the housing shell.

The engaging members may have stop faces which prevent a sliding movement transverse to the movement with which the housing shells are joined to each other.

Securing members which are in engagement with corresponding securing members formed on the joined housing shells may be provided on the inner surfaces of the cover strips, facing the joined housing shells. This causes the joined housing shells to be secured to each other against a disconnecting movement.

The cover strips may also be embodied as clamp members, the clamping engagement of which on the joined housing shells preventing any disconnecting movement of the housing shells. This securing against the housing shells coming apart can also be achieved by the cover strips not only being embodied as clamp members, but also having the securing members which engage with the securing members formed on the housing shells.

In order to fix the cover strips onto the joined housing shells, they may be attached to a ring which is pushed over the joined housing shells. The cover strips and the ring are preferably of one-piece construction. The cover strips and the ring may of metal or plastic.

Another advantageous embodiment of the invention is when the housing shells forming the housing each have a surface covering, the abutting edges of which, when the housing shells are joined together, are covered by the cover strips.

The surface covering may be made of a different material from that of the housing shells, in particular of a decorative material. Suitable decorative materials include, for example, leather, textile fabric, films, carbon fibre fabric, plastic, metal and the like. The surface covering may be embodied in the form of an overlay. The surface covering is preferably embodied as a shaped body, in particular as a cover shell. The shape of the shaped body or cover shell is adapted to the outer surface of the housing shells. The surface covering preferably consists of a sound-absorbing material. Sound-absorbing embossments may be additionally provided on the outer side of the surface covering. However, it is also possible to achieve sound absorption by the embossments on the surface covering.

The pushbutton of the belt buckle may likewise have a surface covering, in particular of a decorative material. The pushbutton portion which is located in the insertion opening for a belt tongue joined to the safety belt or which is adjacent to said insertion opening may have a harder surface than the rest of the surface covering disposed on the pushbutton. Operation of the pushbutton can be improved and made more pleasant by means of the surface covering on the pushbutton, said surface covering consisting in particular of a decorative material, and in particular in the pushbutton portion to which pressure can be manually applied.

The harder surface in the region of the insertion opening can also be achieved by post-curing the material of the surface covering. This post-curing can be achieved with a coating which hardens, for example a plastic coating, or by applying a coat of paint or varnish to the surface, or by impregnating the surface.

The invention also relates to a belt buckle for a vehicle safety belt, in which a locking mechanism is provided in the housing, with which a belt tongue which is inserted through an insertion opening and which is joined to the safety belt can be releasably locked. A visual display device is also provided on the housing, which can be perceived outside the housing with the aid of at least one luminous element disposed inside the housing.

Belt buckles in which the lock state of the belt buckle is indicated by the visual display device are known from DE 2003 15 9 58 U1 and DE 10 2010 0 26 913 A1, for example.

The invention differs from the latter by the at least one luminous element being embodied in such a way that the interior portion of the housing immediately adjacent to the pushbutton is illuminated, and in that a translucent gap is formed between the opaque pushbutton and an opaque rim of the housing recess in which the pushbutton is disposed. The housing components adjacent to the illuminated interior portion, and the pushbutton itself, are impermeable to light, so the light can escape from the inside of the housing through the gap only. This ensures that the position of the pushbutton is clearly indicated so as to make it easier to operate, even when visibility is poor, and specifically when it is dark inside the passenger compartment.

The translucent gap is advantageously designed in such a way that it is provided at least at the pushbutton edges on the opaque portion of the pushbutton to which pressure can be manually applied. The geometrical dimensions of the opaque portion of the pushbutton to which pressure can be manually applied and which is used to operate the belt buckle are rendered discernible by this means. The illuminated gap may have be U-shaped, for example, and may form a continuous or a broken illuminated line. The gap may also have a translucent cover at the pushbutton and/or at the edge of the housing recess.

The at least one luminous element may also be configured in such a way that the insertion opening is also illuminated when the belt tongue has been removed.

The at least one luminous element is preferably integrated in a sensor device which detects the lock state of the belt buckle, for example to detect whether the associated motor vehicle seat is occupied or not. For example, the luminous element may be installed in the casing of the sensor device for detecting the lock state, or in the switch or the display device in a way that ensures the housing interior is illuminated in the manner described above.

The at least one luminous element is preferably switched on by opening at least one of the vehicle doors and before the vehicle engine is started. However, it is also possible for the at least one luminous element to be switched on by a switching function that is performed between the latter two actions.

The at least one luminous element preferably remains switched on during the period in which the belt tongue is locked in place in the locking mechanism. This ensures that the geometrical outlines shape of the pushbutton portion to which pressure can be manually applied are clearly indicated for the purpose of releasing the belt tongue from the locking mechanism, so that they are also discernible even when visibility inside the passenger compartment is poor.

Since all that is illuminated when the belt tongue is locked in place is the gap between the pushbutton and the perimeter of the housing recess, and since the insertion opening either alone or in combination with the gap is illuminated when the belt tongue has been removed from the belt buckle, a switching is provided which indicates whether the belt buckle is closed or open.

If necessary, fibre-optic light guides may lead from the at least one luminous element to the gap to be illuminated and/or to the insertion opening to be illuminated, for example with the aid of a fibre optic coupler. It is also possible to provide at least two luminous elements which are assigned respectively to illuminate the insertion opening and to illuminate the gap.

An LED is preferably suitable for the at least one luminous element.

BRIEF DESCRIPTION OF THE DRAWINGS

The invention shall now be described with reference to embodiments shown in the attached Figures, in which:

FIG. 3(A-C) shows, in perspective views, various embodiments for a pushbutton that can be used in the belt buckle of FIG. 1;

DETAILED DESCRIPTION

The embodiments of a belt buckle for a vehicle safety belt, as shown in the Figures, include a housing 3 in which a locking mechanism 4 (FIG. 12) is arranged. A pushbutton 22 provided on housing 3 is used to operate locking mechanism 4. By means of locking mechanism 4, it is possible to lock in place a belt tongue 26 which is connected to a safety belt 25 and which can be inserted into an insertion opening 24. The belt tongue is locked automatically into place when it is inserted into locking mechanism 4. To release the lock, pressure is applied externally and manually to pushbutton 22. After being released from the locked state, belt tongue 26 is then ejected from the locking mechanism.

In the embodiments shown, housing 3 may be formed by two housing shells 1 and 2. At their shell rims 5, housing shells 1 and 2 have engaging members 6 and 7 which can be brought into engagement with each other by sliding them against each other when rims 17, 18 of the housing shells abut each other. In the embodiments shown, this sliding movement is performed parallel to abutting rims 17 and 18.

Figure 5:
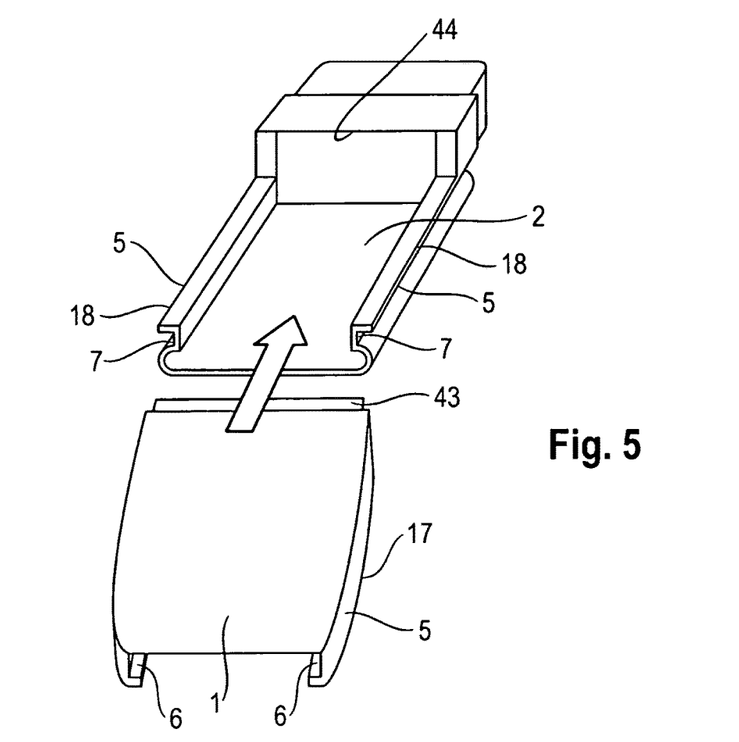
FIG. 5 shows, in a perspective view, another embodiment for two housing shells forming the housing of the belt buckle.
Figure 6:
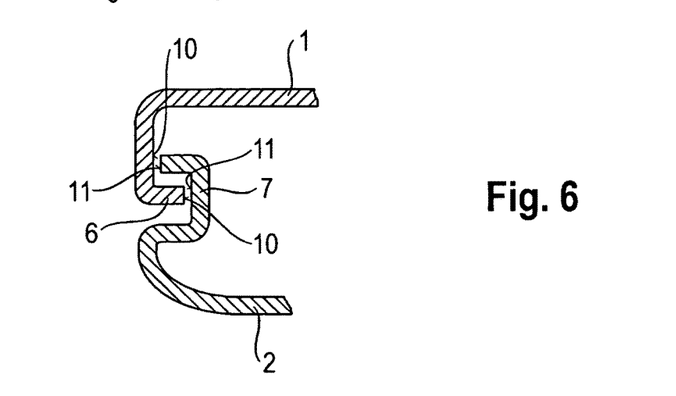
FIG. 6 shows, in a cutaway view, engaging members that engage each other to join two housing shells together.

Engaging members 6 and 7 may be embodied in such a way that they overlap in their engaged position, as shown in FIG. 6. The mutually engaging members 6, 7 may have stop faces 10, 11 abutting each other, which prevent a sliding movement transverse to the connecting movement. As shown in FIG. 5, engaging members 6 and 7 may extend substantially along the entire abutting rims of housing shells 1 and 2. However, it is also possible that engaging members 6 and 7 extend only partly along the length of abutting rims 17 and 18 of housing shells 1 and 2, as shown in FIG. 4.

The two housing shells 1 and 2 are joined to each other by engagement of engaging members 6 and 7, preferably in an overlapping arrangement as shown in FIG. 6. To prevent the joined housing shells 1 and 2 from being disconnected, elongated cover strips 8 and 9 made of solid material are provided which cover the mutually abutting rims 17 and 18 of housing shells 1 and 2. These elongated cover strips 8 and 9 may have securing members 12 disposed on their respective inner surfaces facing the joined housing shells 1 and 2, which engage in corresponding securing members 13 formed on the joined housing shells 1 and 2.

Figure 4:
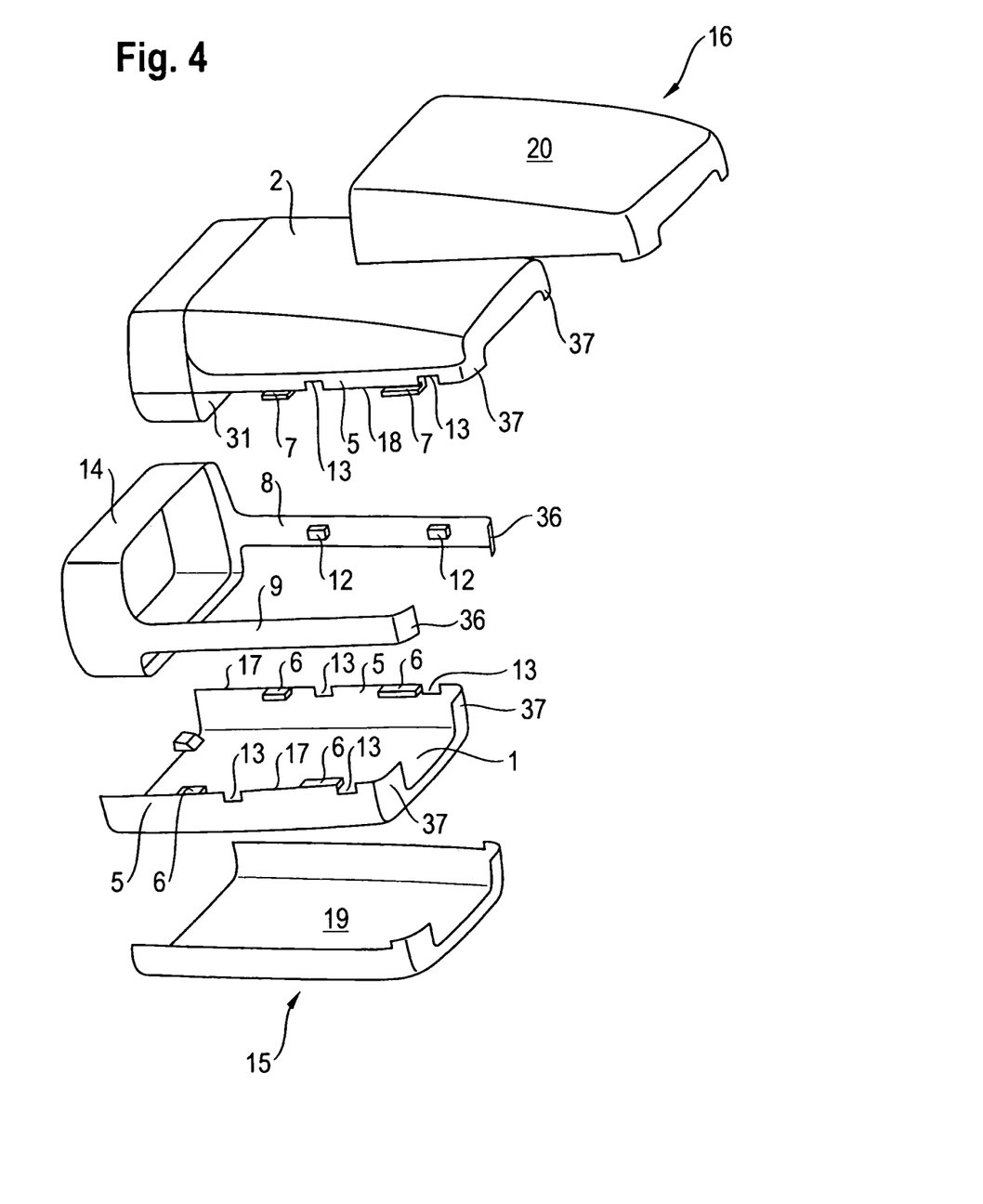
FIG. 4 shows, in a perspective exploded view, components that may be used to form the housing of the belt buckle.

In the embodiment shown in FIG. 4, inwardly extending projections forming securing members 12 are provided on cover strips 8 and 9. Corresponding recesses are provided in the region of rims 17 and 18 on the abutting housing shells 1 and 2 and form the corresponding securing members 13 into which the projections provided on the cover strips extend. This ensures that when housing shells 1 and 2 are in the assembled state, they can no longer move relative to each other, so a secure join is produced to form housing 3.

Figure 11:
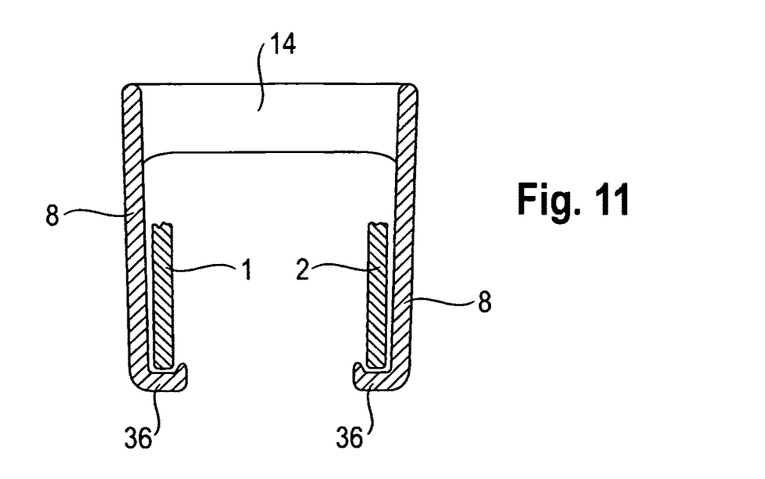
FIG. 11 shows a partially cutaway view of an embodiment of cover strips provided on a ring.

This secure join can also be achieved by embodying cover strips 8 and 9 as clamp members. Their free ends may be embodied as clamp ends 36, as shown in FIG. 11, which prevent any disconnecting movement of the joined housing shells 1 and 2. For that purpose, clamp ends 36 of cover strips 8 and 9 are placed around the joined housing shells 1 and 2, as illustrated in FIG. 11. The joined housing shells 1 and 2 are gripped in the region where their rims abut, in particular in the region of their inwardly facing rim portions 37, as shown in FIG. 4.

Figure 7:
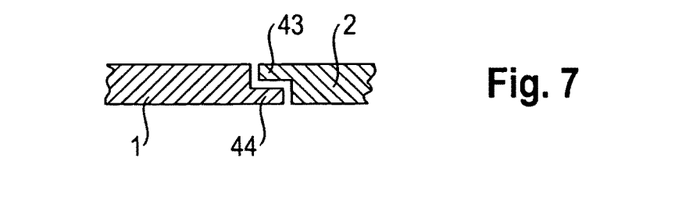
FIG. 7 shows, in a cutaway view, the edges of the two housing shells in FIG. 5 that are slid over each other.

Such securing of the joined housing shells 1 and 2 against any disconnecting movement is preferably used in housing shells 1 and 2, as shown in FIG. 7. In this embodiment, engaging members 6 and 7 extend substantially along the entire abutting rims.

As can be seen from FIG. 4, however, it is also possible to provide both kinds of securing, namely clamp ends 36, and the securing members 12 which are provided on the inner surface of cover strips 8 and 9 and which engage corresponding securing members 13 of the joined housing shells 1 and 2.

Figure 1:
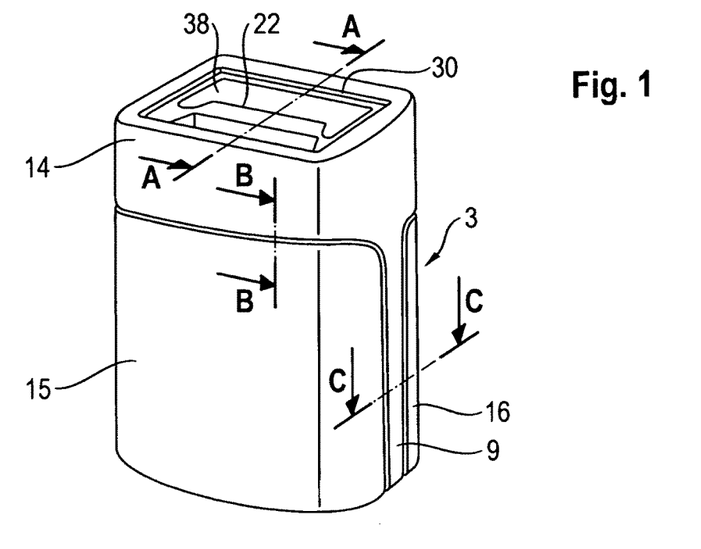
FIG. 1 shows a perspective view of a belt buckle.

In order to secure the elongated cover strips 8 and 9 in place, they may be attached to a ring 14. Ring 14 and cover strips 8 and 9 are preferably of one-piece construction. Cover strips 8 and 9 may be provided on ring 14 so that clamp ends 36 come into springy engagement with the inwardly facing rim portions 37 of housing shells 1 and 2. The other ends of cover strips 8 and 9 are preferably joined integrally to ring 14. Ring 14 and cover strips 8 and 9 are preferably of metal. However, they may also consist of a suitable plastic, for example a fibre-reinforced plastic. Attachment to the joined housing shells 1 and 2 is achieved by ring 14 being pushed with a close fit over the housing portion adjacent to pushbutton 22, as can be seen from FIG. 1. Clamp ends 36 grip around the inwardly facing rim portions 37 of joined housing shells 1 and 2 with springy and/or clamping engagement. FIG. 7 shows in cross-section how the rims 43 and 44 of housing shells 1 and 2 in FIG. 5 are slid over each other.

The two housing shells 1 and 2 may have a surface covering (15, 16). These surface coverings 15, 16 are preferably in the form of shaped bodies, in particular in the form of cover shells 19, 20, as shown in FIG. 4. However, surface coverings 15, 16 may also be embodied in the form of coating, an overlay, or the like. Surface coverings 15 and 16 consist of a different material from that of the housing shells, in particular of a decorative material. Suitable decorative materials include, for example, natural leather, imitation leather, textile fabrics, or fabrics made of plastic fibres, carbon fibres, metal fibres and the like.

Surface coverings 15 and 16 consisting of a sound-absorbing material are preferably used. Suitable such materials include leather, imitation leather, textile fabrics and other fabrics. Sound-absorbing embossments (not shown in further detail) may preferably be provided on the outer side of surface coverings 15, 16. With these embossments, the outer sides of surface coverings 15, 16 lie against vehicle components such as seat components or the centre console.

Figure 10:
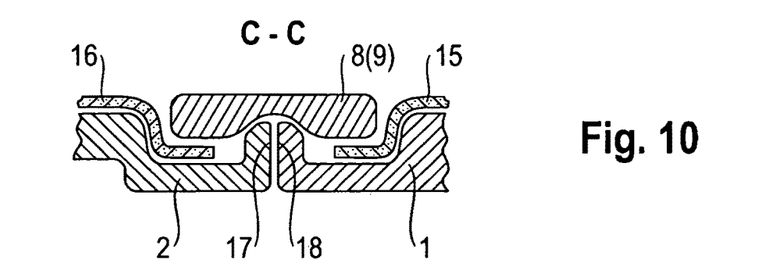
FIG. 10 shows a cross-sectional view along line C-C in FIG. 1.

As can be seen from FIG. 10, the abutting rims 17, 18 of the two joined housing shells 1 and 2, and the rims of surface coverings 15 and 16 are covered by cover strips 8 and 9. As FIG. 4 shows, ring 14 covers the upper rim of the shorter housing shell (bottom housing shell) 1 and the upper rim of surface coverings 15 and 16. Ring 14 also surrounds the ring-shaped upper portion of upper housing shell 2 in which a recess is formed. Pushbutton 22 is disposed in the latter recess. The two housing shells 1 and 2 are joined fixedly to each other by that means also.

Pushbutton 22 may also have a surface covering 38. This surface covering may likewise consist of a decorative material. This decorative material may be the same as the material of surface coverings 15 and 16 for housing shells 1 and 2. However, it may also be a material different from the latter. Examples of materials used for surface covering 38 include leather, imitation leather, or a plastic material that feels on the surface like leather. If substantially the entire surface of pushbutton 22 is fitted with surface covering 38, it is advantageous to provide a pushbutton portion 23 which is adjacent to insertion opening 24 and also, more particularly, to provide a slanting pushbutton portion 42 opposite the remaining pushbutton portion with a hardened surface. That portion of surface covering 38 may be treated by post-curing to achieve that purpose. A hardening overlay of plastic, for example, or a coating of paint or varnish, or a hardening impregnation of the material of surface covering 38 are suitable in this regard.

Figure 3A:
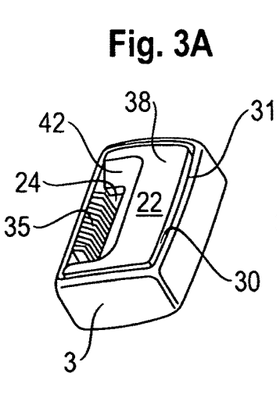
Figure 3B:
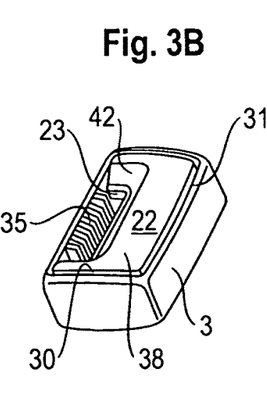
Figure 3C:
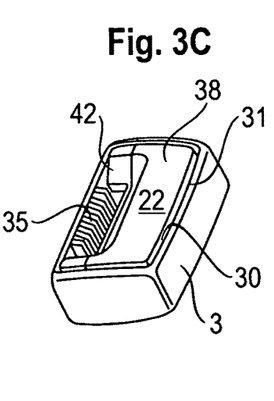
Figure 8:
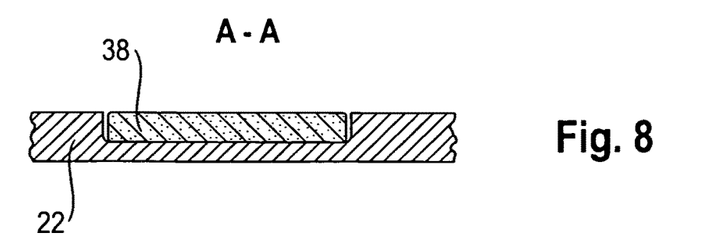
FIG. 8 shows a cross-sectional view through the pushbutton of the belt buckle shown in FIG. 1, along line A-A.
Figure 9:
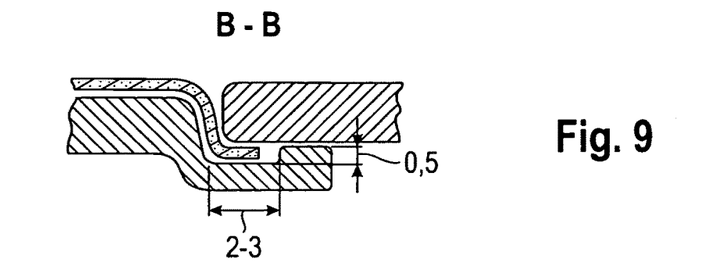
FIG. 9 shows a cross-sectional view along line B-B in FIG. 1.

However, it is also possible to provide surface covering 38 in a recess in the pushbutton surface (FIG. 8), if necessary, in the portion to which pressure is manually applied when the pushbutton is operated. The remainder of the pushbutton, in particular the pushbutton portion 23 adjacent to insertion opening 24 (FIGS. 3A and B) and if necessary the sloping pushbutton portion 42 (FIG. 3C), then has the plastic material of which the pushbutton consists.

Figure 12:
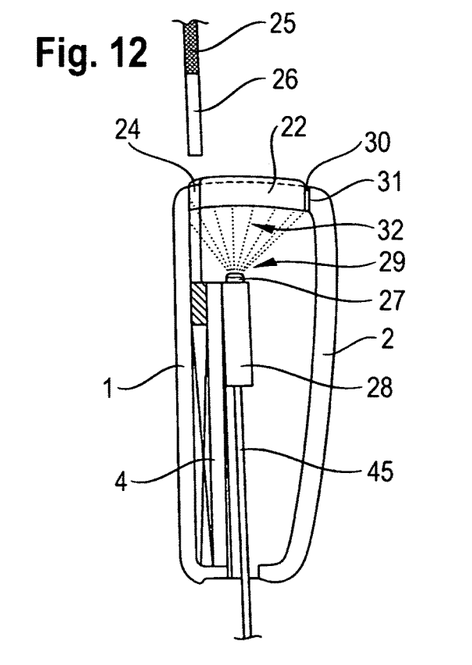
FIG. 12 shows, in a partially cutaway view, a housing of the belt buckle with an illumination device arranged inside the housing.

FIG. 12 shows an embodiment of a belt buckle, in which an illumination device in the form of at least one luminous element 27 is provided inside the housing. The illumination device 29 inside the housing, in particular the at least one luminous element 27, is adapted to illuminate at least one interior portion 32 immediately adjacent to pushbutton 22 (the underside of the pushbutton) inside housing 3. A translucent gap 30 is formed between the opaque pushbutton 22 and the opaque rim 31 surrounding the housing recess in which pushbutton 22 is disposed. As can be seen from FIGS. 4 and 12, the ring-shaped rim portion 31 is integrally joined to housing shell 2, which together with the other housing shell 1 encloses the inside of the housing. As already mentioned, the ring-shaped rim portion 31 surrounds pushbutton 22 and consists, like the entire housing 3, of opaque material.

Figure 2:
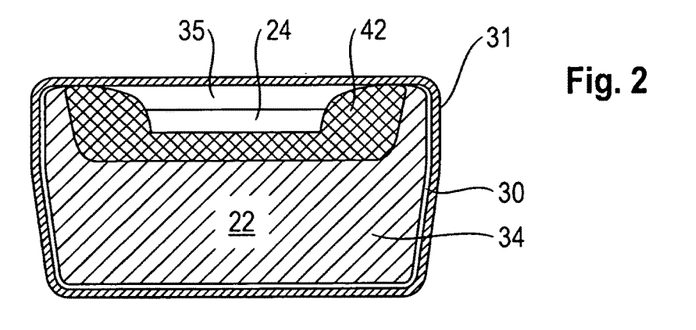
FIG. 2 shows a plan view of the embodiment shown in FIG. 1.

The light emitted from the inside of the housing escapes to the outside through the gap 30 formed between pushbutton 22 and the ring-shaped rim portion 31. In this way, the surface of the pushbutton and in particular its lateral borders are made visually discernible, thus allowing the position of the pushbutton in the vehicle to be seen even when visibility inside the vehicle is poor. More particularly, the translucent gap 30 is present at the pushbutton edges forming a pushbutton portion 34 to which pressure is manually applied (FIG. 2).

Illumination device 29, in particular the at least one luminous element 27, may also be adapted and arranged in such a way that the insertion opening 24 is likewise illuminated when the belt tongue 26 has been removed from the belt buckle. A perimeter region 35 of insertion opening 24 may be illuminated by a fibre optic (not shown), for example.

The at least one luminous element 27 is preferably integrated in a sensor device 28 or switch for detecting the lock state of locking mechanism 4. Luminous element 27 is disposed, more particularly, in the housing of said sensor device 28. Such a sensor device is known from Such an airbag arrangement is known from U.S. Pat. No. 5,960,523, for example.

The at least one luminous element 27 is preferably switched on by a switch 41 (FIG. 13) being closed when at least one of the vehicle doors is opened and before the vehicle engine is started. However, the at least one luminous element 27 may also be switched on by a switching function that is performed between the latter two actions.

It is preferable that the at least one luminous element also remains switched on when belt tongue 26 is locked in place in locking mechanism 4. In this way, the position of pushbutton 22 and in particular the opaque portion of the pushbutton portion 34 to which pressure is manually applied in order to operate the pushbutton is made visually discernible.

Figure 13:
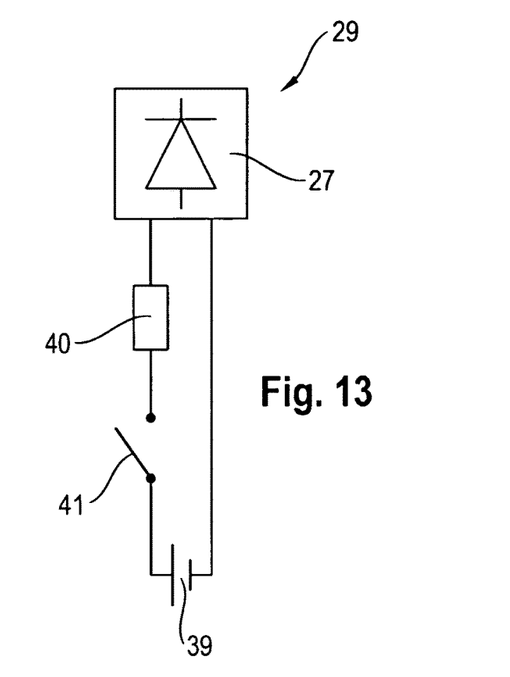
FIG. 13 shows an electrical circuit diagram for the power supply of the illumination device arranged inside the housing.

FIG. 13 shows a circuit for supplying power to the luminous element 27 embodied as an LED. Luminous element 27 is supplied with power from a power supply source 39 via a series resistor 40 when switch 41 is closed. As already explained, switch 41 is closed when at least one vehicle door is opened, but it can also be closed by some other switching function between the door being opened and the engine of the vehicle being started. The power is supplied via a cable 45 (FIG. 12).

Figure 14A:
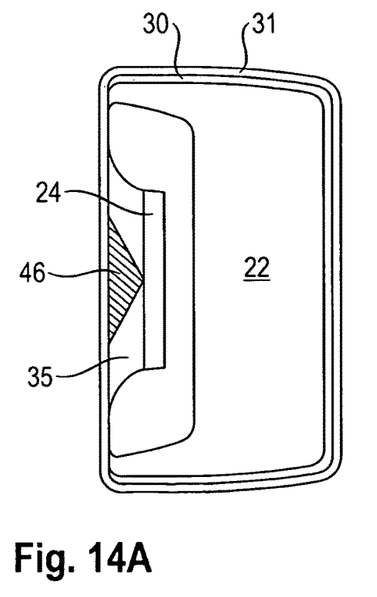
FIGS. 14A, B shows a plan view of the pushbutton, with a border around the housing with illumination switched on and off
Figure 14B:
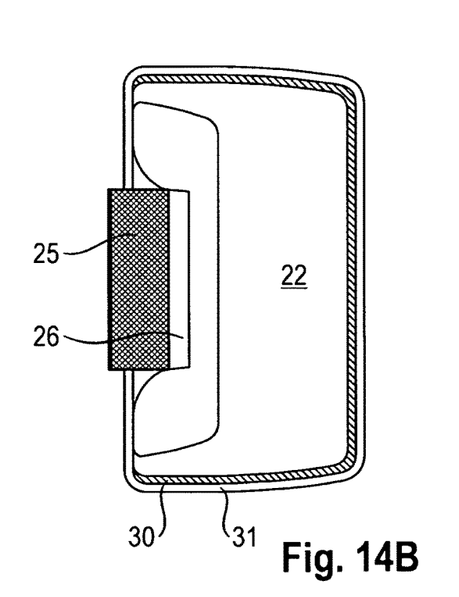

FIG. 14 shows, in a plan view onto the belt buckle, the states in which belt tongue 26 has been removed from the belt buckle (FIG. 14A) and in which belt tongue 26 has been inserted into insertion slot 24 and locked into locking mechanism 4 (FIG. 14B). The illumination for indicating insertion slot 24 and gap 30 is switched between these two states. When the belt tongue has been removed (FIG. 14A), a perimeter region 46, which may be triangular in shape with a point pointing towards insertion slot 24, is illuminated. This may be achieved by a respective luminous element, for example an LED, illuminating perimeter region 46 via a fibre optic. When belt tongue 26 has been inserted into insertion slot 24 and locked into locking mechanism 4 (FIG. 14B), the gap 30 between rim 31 on the housing and pushbutton 22 is illuminated. This may be achieved by switching on a luminous element assigned to gap 30, in particular an LED, in order to illuminate the gap.

With the aid of a luminous element, for example luminous element 27, which works together with a fibre optic coupler (not shown in further detail), it is also possible to switch on the illumination of perimeter region 46 when the belt tongue has been removed and the illumination of gap 30 when belt tongue 26 has been locked into the belt buckle. Such illumination is possible with the aid of the fibre optic coupler, which has a respective switching function. The illuminated states are shown by hatching in views (A) and (B) in FIG. 14.

However, it is also possible to illuminate the perimeter region 46 and gap 30 simultaneously with the aid of illumination device 29, such that gap 30 is also illuminated when belt tongue 26 has been removed from the belt buckle. When belt tongue 26 is inserted in the belt buckle, the illuminated perimeter region 46 is then covered by belt tongue 26 and by safety belt 25 attached thereto.

When fibre optics are used, they may preferably be moulded or injected or clipped into one or into both housing shells 1,2. A suitable plastic material, for example polymethylmetacrylate or polycarbonate, may be used for the fibre optics.

LIST OF REFERENCE SIGNS 1,2 Housing shells
3 Housing
4 Locking mechanism
5 Shell perimeters
6,7 Engaging members
8,9 Cover strips
10,11 Stop faces
12,13 Securing members
14 Ring
15,16 Surface coverings
17,18 Rims
19,20 Cover shells
21 Embossments
22 Pushbutton
23 Pushbutton portion
24 Insertion opening
25 Safety belt
26 Belt tongue
27 Luminous element
28 Sensor device
29 Illumination device
30 Gap
31 Rim
32 Interior portion
33 Switching device
34 Pushbutton portion
35 Perimeter region
36 Clamp ends
37 Inwardly facing rim portions
38 Surface covering
39 Power supply source
40 Series resistor
41 Switch
42 Sloping pushbutton portion
43,44 Edges
45 Cable
46 Illuminable perimeter region

The invention claimed is:

1. A belt buckle for a vehicle safety belt, comprising:
   a housing (3) which is formed by at least two housing shells (1,2) joined together,
   a locking mechanism (4) arranged in said housing, and
   a pushbutton (22) provided on said housing for operating the locking mechanism (4),
   wherein the at least two housing shells (1,2) are joined together at mutually abutting shell rims, and wherein elongated cover strips (8,9) are fixed to the joined housing shells (1,2), said elongated cover strips are formed of solid material and cover the mutually abutting shell rims (17,18) of the housing shells (1,2).

2. The belt buckle according to claim 1, wherein the elongated cover strips (8,9) are adapted to secure the housing shells (1,2) to each other.

3. The belt buckle according to claim 1, wherein said engaging members (6,7) overlap in their engaged position, and wherein said engaging members (6,7) are adapted for a predefined movement which is substantially parallel to the mutually abutting shell rims (17,18) of the housing shells (1,2), in order to join the housing shells (1,2) to each other.

4. The belt buckle according to claim 1, wherein said engaging members (6,7) comprise stop faces (10,11), wherein said stop faces prevent a sliding movement transverse to said predefined movement during joining said at least two housing shells (1,2) to each other.

5. The belt buckle according to claim 1 comprising at least one first securing member (12) provided on an inner surface of the respective cover strips (8,9) which faces the joined housing shells, and wherein said first securing member is in engagement with at least one corresponding second securing member (13) formed on said joined housing shells (1,2).

6. The belt buckle according to claim 1, wherein said elongated cover strips (8,9) are fixed to a ring (14) which is arranged about said housing shells (1,2) joined to each other.

7. The belt buckle according to claim 6, wherein said ring (14) and said cover strips (8,9) are formed of a one-piece construction.

8. The belt buckle according to claim 1, wherein said cover strips (8,9) are formed as clamp members.

9. The belt buckle according to claim 1, wherein the cover strips (8,9) are formed of metal or plastic material.

10. The belt buckle according to claim 1 wherein said at least two housing shells (1,2) each comprise a surface covering (15,16), wherein edges of said surface coverings (15,16) are covered by said cover strips (8,9).

11. The belt buckle according to claim 10, wherein said surface coverings (15,16) are made of a material, which is different from that of the housing shells.

12. The belt buckle according to claim 11, wherein the material said surface coverings are made of is at least one of the group of materials comprising: leather, imitation leather, plastic, textile fabric, carbon fibre fabric, metal.

13. The belt buckle according to claim 10, wherein said surface coverings (15,16) are in the form of a coating.

14. The belt buckle according to claim 10, wherein said surface coverings (15,16) are in the form of second cover shells (19,20).

15. The belt buckle according to claim 10, wherein said surface coverings (15,16) consist of a sound-absorbing material.

16. The belt buckle according to claim 10, wherein a sound-absorbing structured surface is provided on an outer surface of at least one of said surface coverings (15,16).

17. The belt buckle according to claim 1, wherein said pushbutton (22) has a surface covering (38) made of a material, which is different from that of the housing shells, is selected from the group of materials comprising: leather, imitation leather, plastic, textile fabric, carbon fibre fabric, metal, sound-absorbing material; or comprise a sound-absorbing structured surface.

18. The belt buckle according to claim 1, wherein a portion of said pushbutton which is located adjacent to an insertion opening (24) for a belt tongue (26) attached to a safety belt (25), has a harder surface than a surface covering (38) which is disposed on a portion of said pushbutton onto which pressure can be manually applied.

19. The belt buckle according to claim 18, wherein said harder surface of said portion of said pushbutton having said harder surface is formed by post-curing the material of the surface covering (38).

20. The belt buckle according to claim 18, wherein said harder surface is formed by applying a hardening coating to the surface covering (38).

* * * * *